United States Patent [19]

Reusche et al.

[11] Patent Number: 5,345,063
[45] Date of Patent: Sep. 6, 1994

[54] NESTABLE STACKABLE HEATED BOWL WITH REMOVABLE THERMOSTATICALLY CONTROLLED ELECTRIC HEATING ELEMENT

[75] Inventors: Thomas K. Reusche, Wayne; Donald W. Reusche, St. Charles; Donald B. Owen, Villa Park; Frank A. Hassell, Geneva, all of Ill.

[73] Assignee: Allied Precision Industries, Inc., Geneva, Ill.

[21] Appl. No.: 929,885

[22] Filed: Aug. 11, 1992

Related U.S. Application Data

[63] Continuation-in-part of Ser. No. 565,469, Aug. 10, 1990, Pat. No. 5,140,134.

[51] Int. Cl.⁵ .......................... H05B 1/02; H05B 3/00; A01K 5/01; A47J 31/00
[52] U.S. Cl. ..................................... 219/441; 119/73; 219/436; 219/438; 219/449; 392/444
[58] Field of Search ................................ 219/429–442, 219/521, 520, 385, 449, 450, 436, 438, 443, 456; 119/73; 392/403, 406, 405, 444, 441, 459

[56] References Cited

U.S. PATENT DOCUMENTS

| | | | |
|---|---|---|---|
| 726,241 | 4/1903 | Ayer | 219/433 |
| 1,743,301 | 1/1930 | Wolcott | 219/434 |
| 1,997,485 | 4/1935 | Cwelich | 219/436 |
| 2,035,147 | 3/1936 | Dennis | 219/436 |
| 2,536,596 | 1/1951 | Fisher | 219/436 |
| 2,694,767 | 11/1954 | Levey | 219/433 X |
| 2,798,931 | 7/1957 | Naxon | 219/433 |
| 2,872,560 | 2/1959 | Bowles | 219/433 X |
| 3,328,561 | 6/1967 | Sakamoto et al. | 219/442 |
| 3,585,362 | 6/1971 | Heegesteger et al. | 219/439 |
| 3,606,697 | 9/1971 | Eden | 219/442 X |
| 3,622,036 | 11/1971 | Bongaerts | 119/61 X |
| 3,722,476 | 3/1973 | Van Ness et al. | 119/61 |
| 3,982,095 | 9/1976 | Robinson | 392/403 |
| 4,063,068 | 12/1977 | Johnson et al. | 219/436 X |
| 4,138,606 | 2/1979 | Brown | 219/436 X |
| 4,142,094 | 2/1979 | Barradas | 219/442 X |
| 4,164,645 | 8/1979 | Dogliotti | 219/441 X |
| 4,284,878 | 8/1981 | Bartels | 392/403 |
| 4,439,668 | 3/1984 | Wells | 219/438 |
| 4,561,384 | 12/1985 | Liff | 119/73 |
| 4,967,061 | 10/1990 | Weber et al. | 219/438 |
| 5,140,134 | 8/1992 | Reusche et al. | 219/441 |

FOREIGN PATENT DOCUMENTS

| | | | |
|---|---|---|---|
| 277625 | 9/1914 | Fed. Rep. of Germany | 219/438 |
| 517324 | 12/1920 | France | 219/438 |
| 694282 | 9/1930 | France | 219/436 |
| 986094 | 3/1951 | France | 219/438 |

Primary Examiner—Anthony Bartis
Attorney, Agent, or Firm—Allegretti & Witcoff, Ltd.

[57] ABSTRACT

An electrically heated molded plastic pet feeding bowl capable of being interengagedly stacked in nested relationship with similar bowls for shipment or storage has a removable electric heating unit insertable through an open bottom of the bowl into heat exchange relationship with the bottom wall of an open-top bowl cavity holding food or water to be heated. The removable heating unit includes a bottom base having an electric heating element disposed on its upper side electctrically connected to and surrounding a centrally located thermostatic control on the upper side of the bottom base. The bottom base has an upwardly convex shape for ensuring that the heating element and thermostatic control are in proper heat transfer relationship with the bottom wall of the bowl when the heating unit is installed on bowl. The under side of the bottom base has a plurality of posts about which a flexible electrical cord for supplying power to the heating element can be wound for storage within the open bottom of the bowl. A series of spaced tapered wedges on the bottom base cooperate with corresponding apertures on the bowl to removably secure the heating unit to thereto.

11 Claims, 3 Drawing Sheets

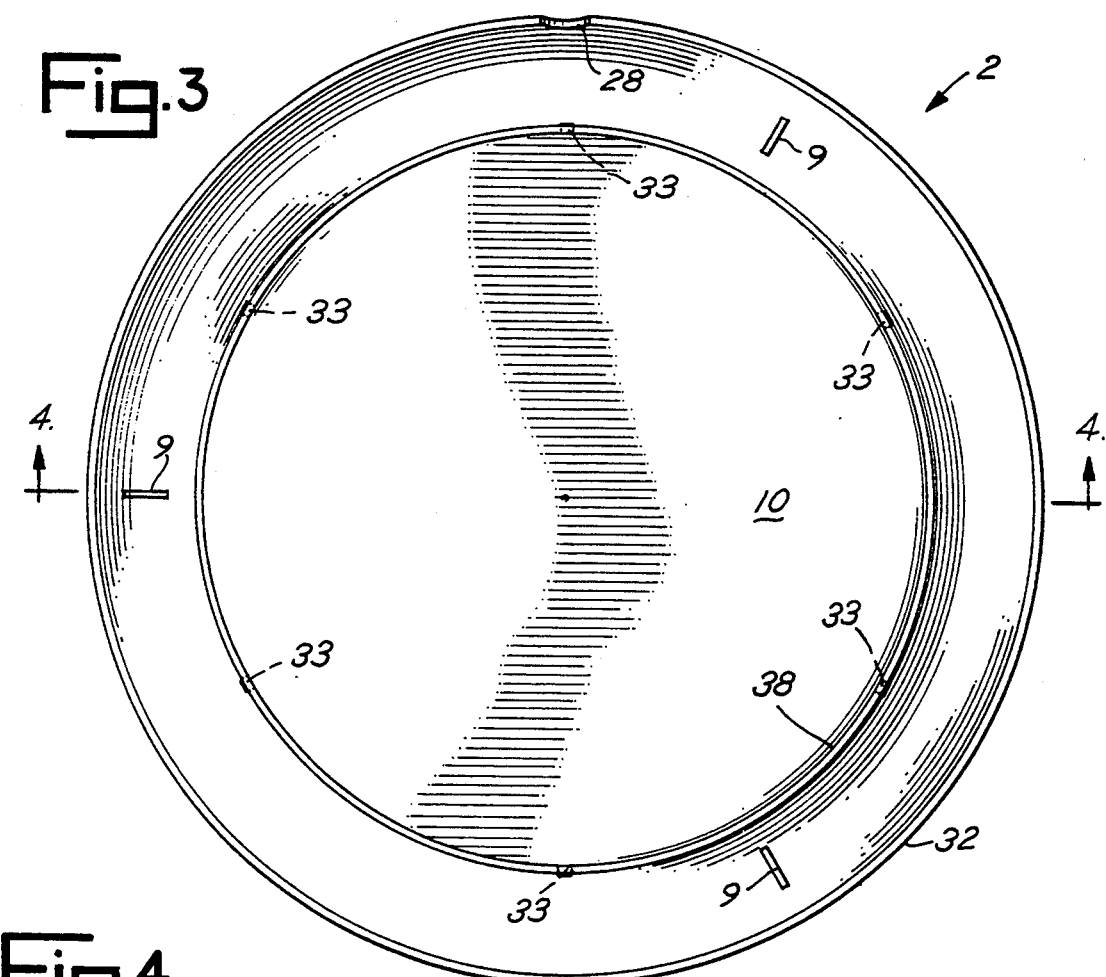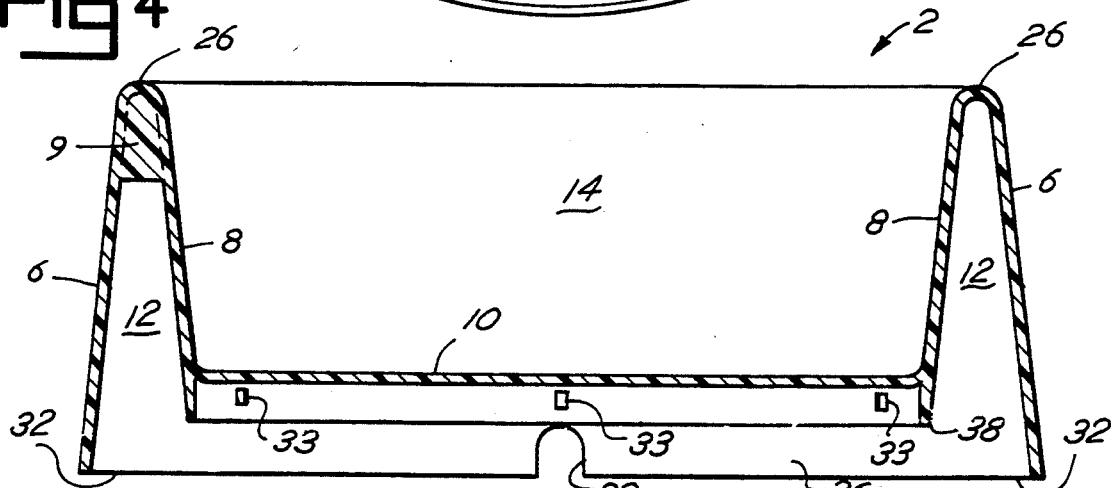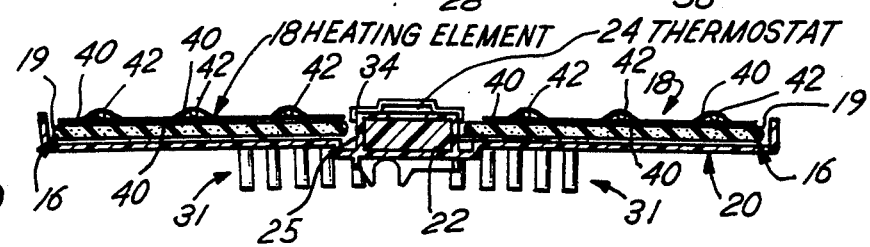

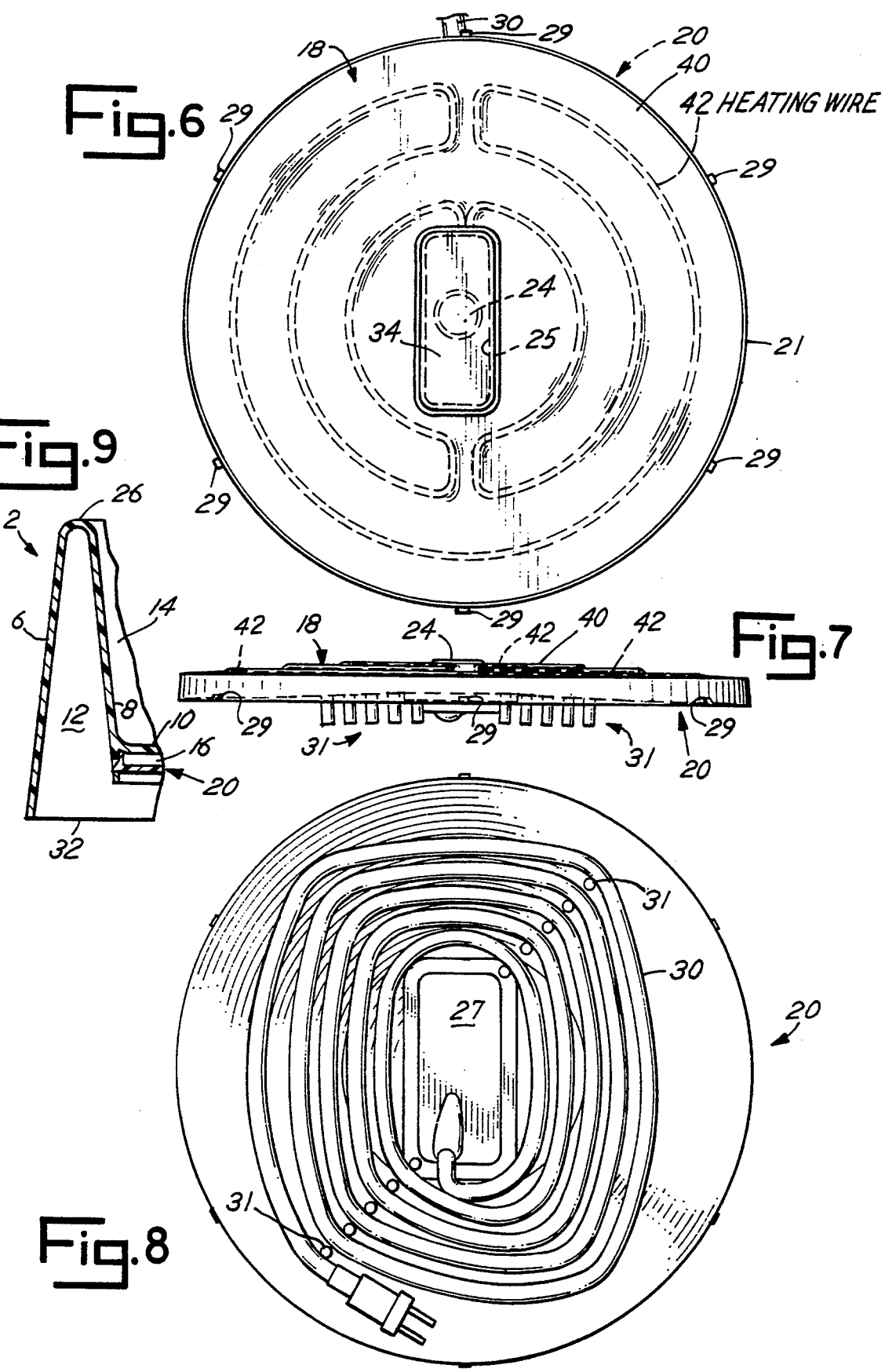

NESTABLE STACKABLE HEATED BOWL WITH REMOVABLE THERMOSTATICALLY CONTROLLED ELECTRIC HEATING ELEMENT

RELATED APPLICATION

This is a continuation-in-part application of Ser. No. 07/565,469, filed Aug. 10, 1990, now U.S. Pat. No. 5,140,134.

BACKGROUND OF THE INVENTION

The present invention relates generally to a heated bowl designed to prevent liquids such as water from freezing when placed outside in cold, below freezing weather, and more particularly to a heated pet bowl that permits like bowls to be stacked and nested upon one another in a stable fashion to permit the bowls to be placed on public display and/or to be stacked in a small amount of space in the home or in the store.

Heated bowls, particularly bowls designed to keep water from freezing in below freezing temperature so that a pet will have access to water or food at all times, were known prior to the present invention. The prior art pet bowls, however, all had a common undesirable feature; that is, all of the prior art pet bowls known to the inventors were not nestable in an interengaging compact fashion. In particular, the prior art heated pet bowls are manufactured by placing a heating element in the bottom of the bowl and enclosing the entire bottom of the pet bowl. By enclosing the entire bottom of the bowl there is produced a structure that does not permit the bowls to be conveniently nested or for the power cord to be conveniently stored in the bottom portion of the bowl.

The present invention also relates generally to a stackable heated bowl wherein the heating means is removable from the remainder of the bowl. The removability of the heating portion of the bowl makes immersion of the entire bowl portion possible during cleaning and permits the bowl portion to be used alone when heating is not required. Additionally, it provides for easy replacement of damaged components of the heated bowl.

SUMMARY OF THE INVENTION

The present invention has been devised in such a way as to avoid the above-mentioned undesirable features of inability to nest interengagingly and inability to store the power cord. To this end, the improved device encloses a removable heating element in a thin cavity beneath the bowl. Rather than totally enclosing the entire area under the bowl, the improved device leaves open the space beneath the thin cavity and behind and underneath the sides of the bowl. In the center portion of this open space, the power cord of the device may be neatly coiled adjacent to the heating element cavity and around a centrally positioned thermostat mechanism for storage during shipment. In the circumferential portion of this open space, a second bowl will fit neatly, thus allowing for the nestable stacking of a plurality of such bowls.

The present invention also provides a removable upwardly convex-shaped bottom base having a heating element, thermostat mounted on the upperside thereof and flexible electrical cord associated therewith. Posts located on the underside of the removable convex bottom base may be used to retain the flexible electrical cord of the heating element on the bottom base. The heating element, thermostat, and flexible electrical cord may thereby be together quickly and easily removed along with the bottom base as a single self-contained unit.

Securing means associated with the upwardly convex bottom base and inner wall below the interior bottom of the molded bowl removable retain the convex bottom base in position below the interior bottom of the bowl. The upwardly convex shape of the removable bottom base naturally ensures a proper heat transfer relationship between the heating element, thermostat and the bottom of the molded bowl when the removable bottom base is in position.

Therefore, it is an object of the present invention to provide a heated bowl wherein a plurality of bowls can be nested one upon another in a manner that minimizes storage space.

Another object of the present invention is to provide a heated bowl which provides space for storing the cord used to provide electric power to the bowl in a space beneath the bottom of the heated inverted bowl, while still permitting the heated bowls to be nested one upon another in a manner that minimizes storage space during shipment.

Yet another object of the present invention is to provide an improved nestable heated bowl for pet food or the like which interengages with another like bowl to provide a stable and compact stack.

Further, it is another object of the present invention to provide a heated bowl wherein the heating means is removable from the remainder of the bowl.

Other objects and advantages of the present invention will be made more apparent hereinafter.

BRIEF DESCRIPTION OF THE DRAWINGS

There is shown in the attached drawing a presently preferred embodiment of the present invention, wherein like numerals in the various views refer to like elements, and wherein:

FIG. 3 is a bottom view of the molded bowl without bottom base;

FIG. 4 is a side cross-sectional view of the molded bowl taken generally along line 4—4 of FIG. 3;

FIG. 5 is a side cross-sectional view of the bottom base;

FIG. 6 is a top view of the bottom base with the heating clement and thermostat positioned therein;

FIG. 7 is a side view of the bottom base with the heating element and thermostat positioned therein;

FIG. 8 is a bottom view of the bottom base with electrical cord thereon; and,

FIG. 9 is a segment of a side cross-sectional view of the molded bowl with bottom base therein.

DETAILED DESCRIPTION OF THE INVENTION

Figure 1:
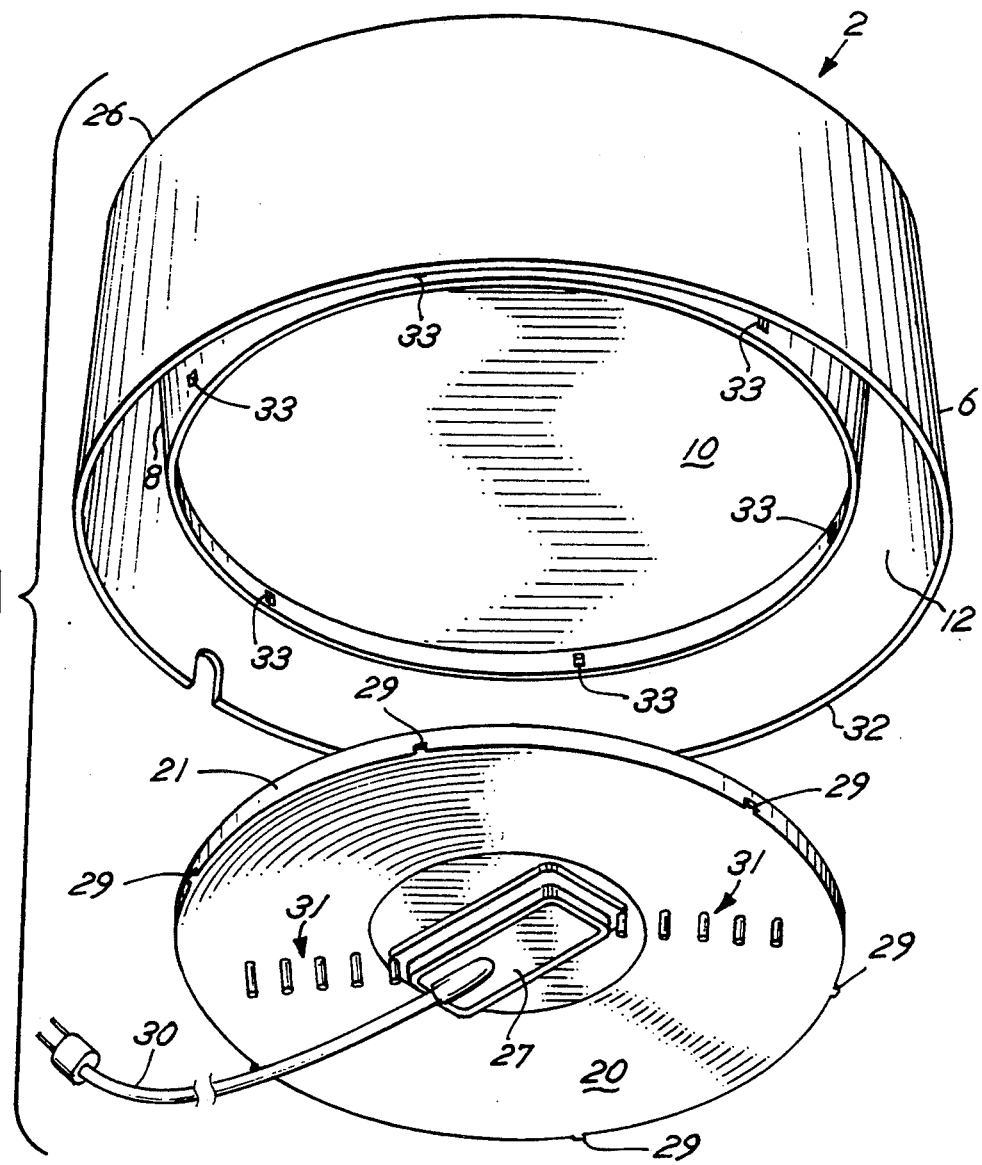
FIG. 1 is an exploded, bottom perspective view of the molded bowl and bottom base with electrical cord.
Figure 2:
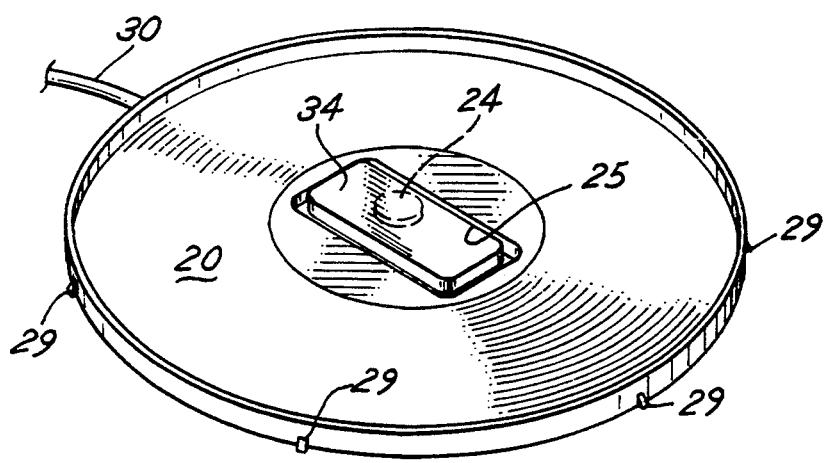
FIG. 2 is a top perspective view of the bottom base with thermostat.

Illustrated in FIG. 1 is a nestable heated bowl 2 which is formed from a molded plastic by means well known to those trained in the art. The molded bowl 2 is provided with an outer wall 6, an inner wall 8 and an interior bottom 10. Preferably, the bowl 2 is circular, as shown, for ease of cleaning, though other shapes, such as square, arc possible, as will be apparent to persons trained in the art. As best illustrated in FIG. 4, the inner wall 8 and bottom 10 cooperate to define a hollow cavity 14 for containing liquid, or food, within the bowl structure 2. Outer wall 6 and inner wall 8 taper upwardly and are spaced apart a distance sufficient to define a space 12 between outer wall 6 and inner wall 8. Walls 6 and 8 meet at the top to provide a curved or rounded bowl edge 26. The bottom edge 32 of outer wall 6 defines an open lower end of the bowl.

The bowl edge 26 of top bowl 2 is designed to extend substantially upward within space 12 of a like upper dish (not illustrated). As a result, approximately 12 like bowls can be stacked upon one another and take up the same amount of space as four bowls of the prior art. If desired, spacers 9 may be included between outer wall 6 and inner wall 8 below rounded bowl edge 26 so as to limit the extent to which bowl 2 extends upwards within space 12 of a like upper dish, thereby preventing nested bowls from becoming wedged too tightly within one another.

Aside from reducing packing space, the bowls of the present invention are substantially more stable when stacked upon each other than the prior art bowls because of the insertion of edge 26 of one bowl into the space 12 of a second bowl. In the prior art, the bottom of the bowl is enclosed at bottom edge 32. As a result, the bowls cannot be stacked in an interengaging manner, as with the present invention, and there is no room to store an electrical cord within the base of the bowl.

Referring to FIG. 9, stackable heated bowl 2 is provided with a heating element cavity 16 between the bottom 10 of hollow cavity 14 and bottom base 20. Specifically, bottom 10 and base 20 cooperate to provide a hollow cavity 16. A conventional flat resistive heating element 18, as illustrated in FIG. 6, is placed in this cavity 16 in heat transfer relationship with the bottom 10.

Referring now to FIGS. 5 and 6, foam insert 19 provides insulation for cavity 16 and helps the transfer of heat from heating element 18 to the bottom 10 of the bowl. Heating element 18 provides uniform heating with almost full contact between the flat bottom 10 of the bowl and the flat top surface of heater element 18. This arrangement maximizes heat transfer to bottom 10 of the bowl. As illustrated in FIGS. 5 and 6, heating element 18 is a double layer of thin, conductive, flexible sheet material 40 having a silicone insulated resistive wire 42 between the layers. As explained hereinafter, electricity is provided to heating element 18 by the electric cord 30 via the thermostat 24.

Positioned in the center of the bottom base 20 is a cavity wall 25 defining a thermostat cavity 22 adapted to receive a conventional thermostat 24. The cavity wall 25 through which the resistive wire 42 of the heating element 18 enters the thermostat cavity 22 can be sealed with a material such as a clay gap filler. If necessary, between the thermostat 24 and the bottom 10 of the bowl may be placed a thermal enhancing compound, such as a heat sink compound, or a thermally conductive pad (not illustrated) for increasing thermal conductivity between the interior bottom 10 and the thermostat 24.

The temperature of the contents of the liquids or solids placed within cavity 14 is monitored by thermostat 24 which, in turn, controls the amount of electricity to heating element 18 and thus the amount of heat transmitted to the contents of cavity 14. The bottom edge 32 of stackable heated bowl 2 is spaced outwardly from the bottom base 20 of heating element cavity 16 to permit the accommodation of a conventional electric cord.

A conventional electric cord 30 is connected to thermostat 24 in thermostat cavity 22. The flexible electric cord 30 extends from the cavity 22 and is then looped around thermostat cavity 22 and placed on top of bottom base 20 when the bowl is inverted. The cord 30 then occupies the space 36 between the bottom edge 32 of the bowl and bottom base 20. The cord 30 is wound or looped so as to lie in a generally horizontal plane. Posts 31, as shown in FIGS. 1, 5, 7 and 8, may be provided on the bottom base 20. The cord 30 can be wound against the posts 31, in a manner similar to that shown in FIG. 8, to help secure the wound cord 30 to the bottom base 20 during shipment and storage. The cord 30 should not extend beyond the perimeter or edge 38 of bottom base 20. If the cord extends beyond edge 38 it could interfere with the placement of top bowl edge 26 into the space 12 between walls 6 and 8 and thus interfere with the compact interengaging nesting of the bowls. The cord 30 slopes upwardly and outwardly from the bottom of the cavity 22. The leads (not illustrated) from cord 30 are secured to thermostat 24 and to the heating element 18 in a conventional fashion. Preferably, the cavity 22 is filled with an epoxy or other potting compound 27 to secure the leads from the end of the cord 30 in place and to protect against moisture. To assist in sealing the thermostat cavity 22 and also to provide protection to the thermostat 24, an adhesive-backed foil sheet 34 may be secured to the top surface of the thermostat 24 and wrapped around the edge of cavity wall 25 in a manner similar to that which is best shown in FIG. 5.

If desired, the bottom base 20 and inner wall 8 can be configured to make possible the removal of the bottom base 20 from the molded bowl 2, thereby also removing the heating element 18, thermostat 24, and cord 30. To removably retain the bottom base 20 and thus the heating element 18 in heat transfer relationship with the interior bottom 10 of the molded bowl 2, securing wedges 29 located around the outer edge 21 of the bottom base 20 communicate with the wedge apertures 33 positioned on the inner wall 8 below the interior bottom 10. Removal of the bottom base 20 is accomplished by withdrawing each securing wedge 29 from its corresponding wedge aperture 33. The bottom base 20 is preferably of a convex shape, as best shown in FIGS. 5 and 7, to ensure contact between the thermostat 24 and the bottom 10 of the molded bowl 2 when the bottom base 20 is secured to the molded bowl 2.

When the stackable heated bowl 2 is used, the flexible electrical cord 30 is uncoiled from the bottom wall of the inverted bowl and placed through notch or opening 28 in outer wall 6. This permits the stackable heated bowl 2 to be placed right side up on a flat surface during use.

While we have shown a presently referenced embodiment of the present invention, it is understood that the invention may be otherwise embodied within the scope of the following claims.

What is claimed:

1. A nestable heatable bowl comprising an outer wall and a bottom wall connected to one another, the inner wall and bottom wall defining an open top cavity for holding material, the bottom wall being spaced upwardly from the plane of the bottom edge of the outer wall, said bottom edge of the outer wall defining an open bottom of the bowl, the inner wall and outer wall tapering toward a joinder defining an upper bowl edge and said inner and outer walls cooperating to define an open annular space communicating with said open bottom which is adapted to receive the upper bowl edge, inner wall and outer wall of a second like bowl in an interengaging stacked and nested relationship, a removable upwardly convex bottom base, a thermostatic control means centrally located on an upper side of the removable convex bottom base and in a temperature-sensing relationship with the bottom of the bowl for regulating the temperature of the bowl, a heating element on the upper side of the removable convex bottom base around the thermostatic control means and electrically connected to the thermostatic control means, and cooperating means on the removable convex bottom base and inner wall detachably securing the removable convex bottom base to the bowl whereby the heating element and thermostatic control means are in heat transfer relationship with the underside of the bottom wall of the open top cavity.

2. A nestable heatable wall as in claim 1, wherein the cooperating means includes at least one aperture in the inner wall and wedge means on the removable convex bottom base for cooperating with the apertures.

3. A nestable heatable bowl as in claim 2, wherein the wedge means comprises protrusions having a tapered shape.

4. A nestable heatable bowl as in claim 1, further comprising securing means on a bottom surface of the removable convex bottom base for retaining on the bottom surface a flexible electrical cord electrically connected to the thermostatic control means.

5. A removable heating apparatus for use in connection with a nestable heatable bowl, the bowl having an outer wall, an inner wall and a bottom wall connected to one another, the inner wall and bottom wall defining an open top cavity for holding material, the bottom wall being spaced upwardly from the plane of the bottom edge of the outer wall, said bottom edge of the outer wall defining an open bottom of the bowl, the inner wall and outer wall tapering toward a joinder defining an upper bowl edge and said inner and outer walls cooperating to define an open annular space communicating with said open bottom which is adapted to receive the upper bowl edge, inner wall and outer wall of a second like bowl in an interengaging stacked and nested relationship, the removable heating apparatus comprising a removable upwardly convex open-top bottom base, a thermostatic control means centrally located on an upper side of the removable convex bottom base, a heating element on the upper side of removable convex bottom base around the thermostatic control means and electrically connected with the thermostatic control means, and attachment means on the removable convex bottom base for detachably securing the removable convex bottom base to a bowl whereby the thermostatic control means and the heating element are in heat transfer relationship with the bowl.

6. A removable heating apparatus as in claim 5, wherein the attachment means includes wedge means for cooperating with at least one aperture on a bowl.

7. A removable heating apparatus as in claim 6, wherein the wedge means comprises protrusions having a tapered shape.

8. A removable heating apparatus as in claim 5, further comprising securing means on a bottom surface of the removable convex bottom base for retaining on the bottom surface a flexible electrical cord electrically connected to the thermostatic control means.

9. A water-resistant removable heating apparatus for use in connection with a heatable bowl, the water-resistant removable heating apparatus comprising a removable bottom base, an electrically-insulated thermostatic control means located on an upper side of the removable bottom base for regulating the temperature of a bowl, an electrically-insulated heating element on the upper side of the removable convex bottom base around the thermostatic control means and electrically connected with the thermostatic control means, a flexible electrical cord electrically connected with the thermostatic control means, securing means on a bottom surface of the removable bottom base for retaining on the bottom surface the flexible electrical cord, and attachment means on the removable bottom base for detachably securing the removable bottom base to a bowl whereby the electrically-insulated heating element and thermostatic control means are in heat transfer relationship with a bowl.

10. A water-resistant removable heating apparatus as in claim 9, wherein the attachment means includes wedge means for cooperating with at least one aperture on a bowl.

11. A water-resistant removable heating apparatus as in claim 10, wherein the wedge means comprises protrusions having a tapered shape.

* * * * *